United States Patent
Krabiell et al.

[11] Patent Number: 5,827,354
[45] Date of Patent: Oct. 27, 1998

[54] CONTAINER FOR CARBON MOLECULAR-SIEVE MATERIAL

[75] Inventors: Kai Krabiell, Hattingen; Alfons Schulte-Schulze-Berndt, Bad Bentheim; Detlef Schafer, Mulheim/Ruhr, all of Germany

[73] Assignee: CarboTech-Anlagenbau GmbH, Germany

[21] Appl. No.: 564,368

[22] PCT Filed: Jun. 18, 1994

[86] PCT No.: PCT/EP94/01990

§ 371 Date: Jun. 24, 1996

§ 102(e) Date: Jun. 24, 1996

[87] PCT Pub. No.: WO95/00234

PCT Pub. Date: Jan. 5, 1995

[30] Foreign Application Priority Data

Jun. 24, 1993 [DE] Germany ............... 43 20 942.4

[51] Int. Cl.⁶ ........................................ B01D 53/04
[52] U.S. Cl. .............................. 95/96; 95/130; 96/133; 96/147; 96/151
[58] Field of Search ............... 95/96, 128, 130, 95/902, 903; 96/121, 133, 147, 151; 206/0.7, 204

[56] References Cited

U.S. PATENT DOCUMENTS

| | | | |
|---|---|---|---|
| 2,345,219 | 3/1944 | Sanderson | 95/128 |
| 2,593,132 | 4/1952 | Gannon | 96/151 |
| 3,008,540 | 11/1961 | Gibson, Jr. | 96/121 |
| 3,164,454 | 1/1965 | Wilson | 95/130 |
| 3,240,567 | 3/1966 | Caparreli et al. | 206/0.7 |
| 4,278,453 | 7/1981 | Klein | 96/151 |
| 4,673,420 | 6/1987 | Haker et al. | 96/133 |
| 4,826,510 | 5/1989 | McCombs | 55/179 |
| 4,925,464 | 5/1990 | Rabenau et al. | 55/179 |
| 5,503,662 | 4/1996 | Berger | 206/0.7 |
| 5,549,736 | 8/1996 | Coffield et al. | 96/133 |
| 5,578,115 | 11/1996 | Cole | 96/151 |

FOREIGN PATENT DOCUMENTS

| | | | |
|---|---|---|---|
| 2550466 | 2/1985 | France | 96/133 |
| 2646788 | 4/1990 | France . | |
| 2652486 | 5/1978 | Germany . | |
| 3100769 | 12/1981 | Germany . | |
| 3709424 | 9/1988 | Germany | 95/130 |
| 3803454 | 8/1989 | Germany . | |
| 2155804 | 10/1985 | United Kingdom . | |
| 2232364 | 12/1990 | United Kingdom | 96/133 |
| 90/07970 | 1/1990 | WIPO . | |

Primary Examiner—Duane S. Smith
Attorney, Agent, or Firm—Vickers, Daniels & Young

[57] ABSTRACT

A container for carbon molecular-sieve material which is designed to prevent contamination of carbon materials within the container. The container includes a hollow section with a preferably circular internal cross-section and a rectangular or square external cross-section. Attached to each end of the hollow section are screened structures designed to retain the molecular-sieve material within the hollow section. These screened structures are preferably secured in place by clamping rings. The hollow section can be hermetically sealed for transport and can be sealed by cover plates and bolts.

17 Claims, 2 Drawing Sheets

CONTAINER FOR CARBON MOLECULAR-SIEVE MATERIAL

The invention relates to the art of containers for handling material and, more particularly, a container for a carbon molecular sieve material and a device comprising these containers.

BACKGROUND OF THE INVENTION

Containers for a carbon molecular sieve material are known from DE-PS 26 52 486 and are used in a pressure alternation adsorption plant for the production of nitrogen.

A disadvantageous feature of prior containers for carbon molecular sieve material is that the carbon molecular sieve material initially has to be introduced into a special pack for transportation and then it has to be transferred into the containers of the pressure alternation adsorption plant. As a rule, the emptied disposable transportation containers cannot be used again but have to be disposed of since these contain residual quantities of the carbon molecular sieve material or, as the case may be, dust from the carbon molecular sieve material. Because of the high sensitivity of the carbon molecular sieve material to moisture, the transportation containers must be constructed in a hermetically sealed manner. The transfer of the carbon molecular sieve material has to be carried out with great care using appropriate special equipment. In this regard, contamination of the carbon molecular sieve material has to be prevented on transferring it or, as the case may be, introducing it into the container. In addition, one must ensure that a packing density is achieved on filling that is as high as possible.

SUMMARY OF THE INVENTION

The task that forms the basis of the invention is to provide a container that simultaneously serves as a transportation container and that can be used in an adsorption apparatus, that is assembled in a modular fashion, without the carbon molecular sieve material that is located therein, having to be transferred.

In accordance with the present invention, there is provided a container for a carbon molecular sieve material which is designed to permit transportation of the carbon material. The container preferably includes a hollow section that can be sealed such that gases are prevented or reduced from transversing the seal. The container preferably has a rectangular or square cross-section and the hollow section preferably has a circular cross-section. The hollow section of the container may be formed from a cast, an extrusion casting process, or some other means. For an extrusion casting process, the material of the container preferably consists of a metal such as aluminum which can be processed relatively simply by using an extrusion casting process. Metals such as aluminum have a low specific gravity and a high strength such that such metals can be easily machined and retained their rigidity and form during transportation. However, it is appreciated that other similar types of metals which have similar properties can also be used. Alternatively, the hollow section can be manufactured from a plastic material. Such plastic should have a relatively high strength to resist damage during transportation of the carbon materials.

In accordance with another feature of the preferred embodiment, the container includes screen structures for fixing or retaining the carbon material within the hollow section of the container. The screen structures are preferably located at the head end and the foot end of the hollow section. Preferably, the screen structures consist of a wire mesh, perforated sheeting, sintered metal or combinations thereof. The screen structures can be maintained at the two ends of the hollow section by bolts, adhesives, screws or the like. Preferably, the screens are maintained at the two ends of the hollow section by a clamping ring which rigidly affixes the screen between the clamping ring and the two ends of the hollow section.

In accordance with still another feature of the present invention, the container includes a covering structure which seals materials within the hollow section. The seal is designed to hermetically seal the hollow section and to prevent and reduce gasses from penetrating the seal. The seal is also designed to affix the clamping rings and/or the wire mesh, when used, to the ends of the hollow section. The covering devices are preferably bolted to the ends of the hollow section; however, other means for securing the covering device to the hollow section may be used. The covering devices may be made of a number of materials such as metal, plastic, paper, composite materials or combinations thereof. Preferably, the covering material consists of a gas-tight metal foil which is glued and bolted to the two ends of the hollow section.

In accordance with still another feature of the present invention, the carbon molecular sieve material is introduced into the containers directly from the production plant, that is used for the carbon molecular sieve material by means of a special filling device. In this connection, the lower end is first sealed with the screen structure with the clamping ring together with a covering device consisting either of a lid, that is bolted on, that is made of plastic, paper, metal or a composite material or a gas-tight foil that is glued on. The carbon molecular sieve material is then introduced into the container and the upper end of the hollow section is sealed in a hermetic manner after positioning the screen structure under tension in the same way as at the lower end of the hollow section.

In accordance with yet another feature of the present invention, the container with the carbon molecular sieve material is then transported to the usage location and is inserted into an adsorption apparatus, that has ben assembled in a modular manner, for the production of nitrogen in accordance with the pressure alternation process.

In accordance with another feature of the present invention, the apparatus is assembled in such a way that the containers can be exchanged simply and rapidly. The adsorption apparatus, that has been assembled in a modular fashion, consists of upper and lower hollow sections for the supply of gas and the withdrawal of gas between which one has incorporated the containers in accordance with the invention. The hollow sections for the supply of gas and for the withdrawal of gas are equipped at their ends with valve connection pieces or, as the case may be, holes for the passage of gas. Holes are present at appropriate positions within the hollow section for the accommodation of bolts in order to attach the containers.

In accordance with still yet another feature of the present invention, the containers are inserted pair-wise inside the adsorption apparatus, that has been assembled in a modular fashion, in order to produce nitrogen in accordance with the pressure alternation adsorption process, whereby up to 20 pairs can be inserted one behind the other. The upper and lower hollow sections for the supply of gas and the withdrawal of gas are constructed in accordance with the number of pairs of containers. The pair-wise arrangement permits continuous operation of the apparatus.

In accordance with yet another feature of the present invention, the containers are designed such that while one side is located in the adsorption phase, the other side is being regenerated. After a defined adsorption time/regeneration time, switching over takes place from one side to the other side so that the previously regenerated side is then located in the adsorption phase and the side that was previously located in the adsorption phase is being regenerated.

In accordance with still yet another feature of the present invention, the pressure alternation adsorption process for the production of nitrogen that is carried out with the containers in an adsorption apparatus, that has been constructed in a modular fashion, has at least the same efficiency as the types of adsorption apparatus that are usually used in accordance with the two-container system that is known from the prior art. Because of the modular method of construction, the adsorption apparatus can be adapted well to the demand for gas in each case.

These and other advantages will become apparent to those skilled in the art upon reading the following description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF PREFERRED EMBODIMENTS

Figure 1:
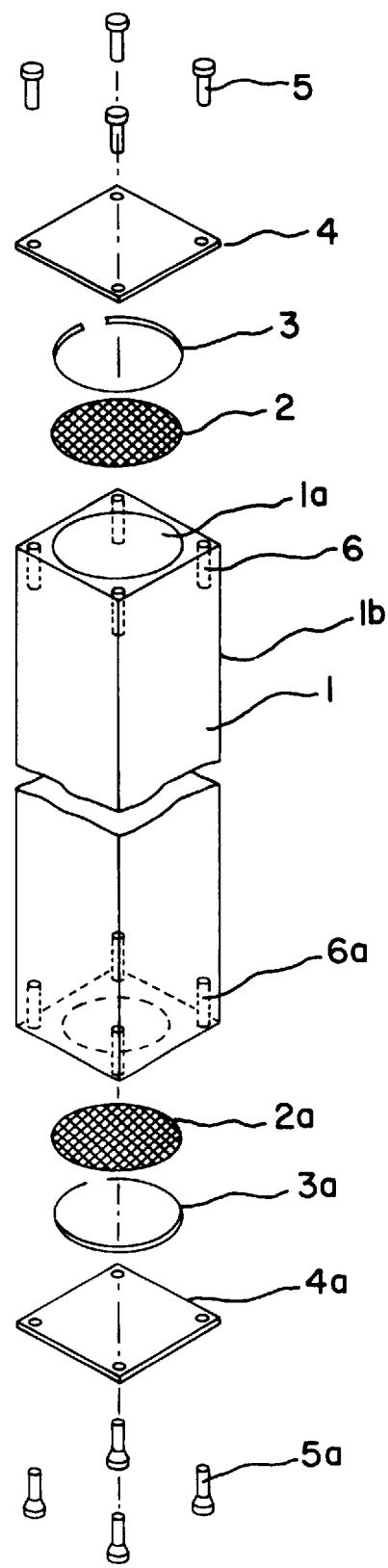
FIG. 1 is an exploded plane view of the container in accordance with the present invention.

Referring now the drawings, wherein the showings are for the purpose of illustrating the preferred embodiments of the invention only and not for the purpose of limiting the same, FIG. 1 illustrates an exploded view of the container of the present invention wherein the container includes a hollows section 1 having a circular cross section 1a internally and a square cross section 1b externally. Screen structures 2, 2a, that are fixed by means of clamping rings 3, 3a and that are used for fixing the carbon molecular sieve material, are attached at both ends of the hollow section 1. The hollow section 1 is sealed in a hermetic manner with covering devices 4, 4a using bolts 5, 5a that are bolted into the holes 6, 6a that have screw threads.

Figure 2:
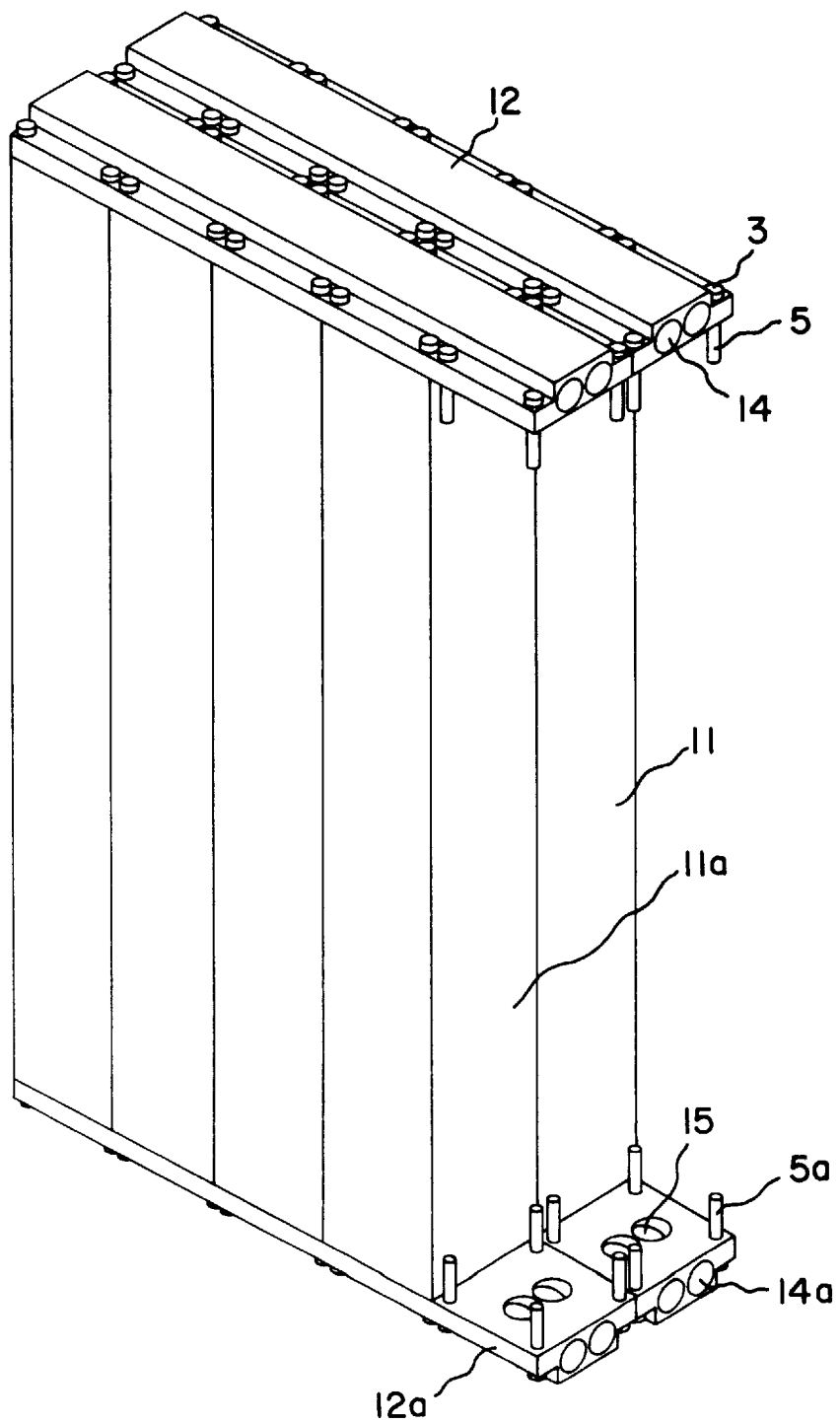
FIG. 2 is a plane view of the arrangement of the containers of the present invention which are mounted in an adsorption apparatus that has been assembled in a modular fashion.

A pressure alternation adsorption plant is illustrated in FIG. 2 from which the arrangement of the containers, in accordance with the invention, is seen in an adsorption apparatus, that has been constructed in a modular fashion, for the production of nitrogen. The containers 11, 11a are arranged pair-wise in any desired number. They are sealed at both ends by hollow sections 12, 12a, for the supply of gas and the withdrawal of gas, with valve connection pieces 14, 14a and holes 15. In this regard, use can be made of bolts 5, 5a (FIG. 1) for fixing the containers in the pressure alteration adsorption apparatus. The pressure alternation adsorption plant can be operated in the form of a known two-container plant.

The invention has been described with reference to a preferred embodiment and alternates thereof. It is believed that many modifications and alterations to the embodiment disclosed will readily suggest themselves to those skilled in the art upon reading and understanding the detailed description of the invention. It is intended to include all such modifications and alterations insofar as they come within the scope of the present invention.

We claim:

1. A portable container for receiving a carbon molecular sieve material for use in a gas adsorption apparatus, said container comprising a hollow section having two ends and extending substantially longitudinally through said container, a screen positioned at each end of said hollow section to maintain said sieve material in said hollow section, a screen retainer to position said screen at each end of said hollow section, a sealing arrangement at each end of said hollow section adapted to hermetically seal said sieve material in said hollow section and to secure said screen retainer to each end of said hollow section, said sealing arrangement including a gas-tight metal material bolted to each end of said hollow section and an adhesive positioned between said metal material and each end of said hollow section.

2. A container as defined in claim 1, wherein said hollow section has a circular cross-sectional area.

3. A container as defined in claim 1, wherein said housing is a low specific gravity, high strength material comprising of a material selected from the group consisting of aluminum or plastic.

4. A container as defined in claim 2, wherein said housing is a low specific gravity, high strength material comprising of a material selected from the group consisting of aluminum or plastic.

5. A container as defined in claim 1, wherein said screen means includes a screen structure selected from the group consisting of wire mesh, perforated sheeting, sintered metal and combinations thereof.

6. A container as defined in claim 4, wherein said screen means includes a screen structure selected from the group consisting of wire mesh, perforated sheeting, sintered metal and combinations thereof.

7. A container as defined in claim 1, wherein said sealing means includes a cover, said cover made of a material selected from the group consisting of metal, plastic, paper, composite material and combinations thereof.

8. A container as defined in claim 6, wherein said sealing means includes a cover, said cover made of a material selected from the group consisting of metal, plastic, paper, composite material and combinations thereof.

9. A container as defined in claim 1, wherein said container is made of aluminum; said hollow section having a substantially circular cross-sectional area; said screen including a wire mesh, perforated sheeting, sintered metal and combinations thereof; said screen retainer being a clamping ring; said sealing arrangement adapted to secure said screen and screen retainer to each end of said hollow section.

10. A modular gas adsorption component for use in a gas adsorption apparatus comprising at least two portable containers containing a sieve material and a container mount; each of said portable containers comprising a hollow section having two ends and extending substantially longitudinally through said container for receiving a molecular sieve material, a screen positioned at each end of said hollow section, a screen retainer to position said screen at each end of said hollow section; said container mount including two sealing surfaces, a gas passageway and a mounting arrangement, said sealing surfaces including a gas-tight metal material bolted to each end of said hollow section and an adhesive positioned between said metal material and each end of said hollow section to hermetically seal each end of said hollow section to said container mount and to secure said screen retainer to each end of said hollow section, said gas passageway in fluid communication with each end of said hollow section, and said mounting arrangement adapted to secure each container to said container mount.

11. A modular gas adsorption component as defined in claim 10, wherein said container being made of aluminum, said hollow section having a substantially circular cross-sectional area, said screen including a wire mesh and said screen retainer being a clamping ring.

12. A method of producing nitrogen in a pressure alternation adsorption process comprising the steps of:

a) hermetically sealing a carbon molecular sieve material in a container, said container including a housing having a hollow section having two ends and extending substantially longitudinally therethrough and designed to hold said carbon molecular sieve material, a screen positioned at each end of said hollow section to maintain said sieve material in said hollow section, a screen retainer to position said screen at each end of said hollow section, a sealing arrangement at each end of said hollow section adapted to hermetically seal said sieve material in said hollow section and to secure said screen retainer to each end of said hollow section, said sealing arrangement including a gas-tight material covering each end of said hollow section and bolted to each end of said hollow-section and an adhesive positioned between said gas-tight material and each end of said hollow section;

b) breaking said hermetic seal at least one end of said hollow section;

c) mounting said container on a container support to hermetically seal each end of said hollow section to said container support and to secure said screen retainer to each end of said hollow section, said container support including two passageways, said fist passageway being in fluid communication with one end of said hollow section and said second passageway being in fluid communication with said other end of said hollow section; and, d) supplying gas in one end of said hollow section and withdrawing gas from said second end of said hollow section during a pressure adsorption process.

13. A method as defined in claim 12, wherein at least two of said containers are modularly connected to said container support, said gas supply to said two containers is controlled such that when one of said containers is used in the adsorption phase, the other of said container regenerated.

14. The method as defined in claim 12, wherein said container is made of aluminum; said hollow section having a substantially circular cross-sectional area; said screen including a wire mesh, perforated sheeting, sintered metal and combinations thereon; said screen retainer being a clamping ring; and said sealing arrangement adapted to secure said screen and screen retainer to each end of said hollow section.

15. The method as defined in claim 13, wherein said container is made of aluminum; said hollow section having a substantially circular cross-sectional area; said screen including a wire mesh, perforated sheeting, sintered metal and combinations thereof; said screen retainer being a clamping ring; and said sealing arrangement adapted to secure said screen and screen retainer to each end of said hollow section.

16. A method as defined in claim 12, including the step of breaking said hermetic seal at each end of said hollow section.

17. A method as defined in claim 15, including the step of breaking said hermetic seal at each end of said hollow section.

\* \* \* \* \*